(12) United States Patent
Chang

(10) Patent No.: US 10,491,883 B2
(45) Date of Patent: Nov. 26, 2019

(54) IMAGE CAPTURING DEVICE

(71) Applicant: Altek Semiconductor Corp., Hsinchu (TW)

(72) Inventor: Jui-Hsin Chang, Hsinchu (TW)

(73) Assignee: Altek Semiconductor Corp., Hsinchu (TW)

( * ) Notice: Subject to any disclaimer, the term of this patent is extended or adjusted under 35 U.S.C. 154(b) by 87 days.

(21) Appl. No.: 15/805,154

(22) Filed: Nov. 7, 2017

(65) Prior Publication Data

US 2018/0131923 A1 May 10, 2018

Related U.S. Application Data

(60) Provisional application No. 62/419,440, filed on Nov. 8, 2016.

(51) Int. Cl.
| | |
|---|---|
| *H04N 13/25* | (2018.01) |
| *H04N 5/225* | (2006.01) |
| *H04N 13/239* | (2018.01) |
| *H04N 13/257* | (2018.01) |
| *H04N 5/33* | (2006.01) |
| *H04N 13/00* | (2018.01) |

(52) U.S. Cl.
CPC ........... *H04N 13/25* (2018.05); *H04N 5/2251* (2013.01); *H04N 5/2252* (2013.01); *H04N 5/2256* (2013.01); *H04N 5/2258* (2013.01); *H04N 5/332* (2013.01); *H04N 13/239* (2018.05); *H04N 13/257* (2018.05); *H04N 2013/0081* (2013.01)

(58) Field of Classification Search
CPC .... H04N 13/25; H04N 5/2251; H04N 13/239; H04N 5/2258
See application file for complete search history.

(56) References Cited

U.S. PATENT DOCUMENTS

| | | | |
|---|---|---|---|
| 9,674,504 B1* | 6/2017 | Salvagnini | G01S 17/89 |
| 9,826,216 B1* | 11/2017 | Hazeghi | G02B 27/0075 |
| 2009/0135247 A1* | 5/2009 | Busse | H04N 13/239 |
| | | | 348/46 |
| 2016/0182846 A1* | 6/2016 | Wan | H04N 5/3765 |
| | | | 348/302 |
| 2017/0017842 A1* | 1/2017 | Ma | G06K 9/00597 |
| 2017/0150067 A1* | 5/2017 | Han | H04N 5/23229 |
| 2017/0264884 A1* | 9/2017 | Chou | H04N 13/128 |

* cited by examiner

*Primary Examiner* — Christopher K Peterson
(74) *Attorney, Agent, or Firm* — JCIPRNET

(57) ABSTRACT

An image capturing device includes a frame structure, a first image capturing unit, at least one second image capturing unit, and an infrared emitting unit, wherein the first image capturing unit, the second image capturing unit, and the infrared emitting unit are respectively disposed on the frame structure. The first image capturing unit and the infrared emitting unit form a structured light depth camera module, and the first image capturing unit and the second image capturing unit form a stereo light depth camera module.

20 Claims, 6 Drawing Sheets

IMAGE CAPTURING DEVICE

CROSS-REFERENCE TO RELATED APPLICATION

This application claims the priority benefit of U.S. provisional application Ser. No. 62/419,440, filed on Nov. 8, 2016. The entirety of the above-mentioned patent application is hereby incorporated by reference herein and made a part of this specification.

BACKGROUND

Technical Field

The invention relates to an image capturing device.

Description of Related Art

As technology advances, more and more electronic products have multi-functional, compact, and high-precision designs. In our daily life, video recording and photo taking functions have become functions indispensable to electronic devices (e.g., image capturing systems, handheld devices, and medical detection devices). To achieve excellent image quality and image effect, the electronic products are mounted with an image capturing device including a plurality of image capturing units for providing extensive image capturing functions.

For example, by using and combining image capturing units of different characteristics and adopting different algorithms, image capturing devices having different functions are formed to, for example, enable the image capturing device to capture 3D images to be applied to uses such as 3D modeling, movement recognition, etc. Therefore, to satisfy the foregoing uses, how to select and combine different image capturing units and meanwhile reduce structural and assembly errors has become one of the issues that persons skilled in relevant arts need to study.

SUMMARY

The invention provides an image capturing device in which different image capturing units are assembled to a frame structure to form camera modules of different functions.

The image capturing device of the invention includes a frame structure, a first image capturing unit, at least one second image capturing unit, and an infrared emitting unit. The first image capturing unit, the second image capturing unit, and the infrared emitting unit are respectively disposed on the frame structure, wherein the first image capturing unit and the infrared emitting unit form a structured light depth camera module, and the first image capturing unit and the second image capturing unit form a stereo light depth camera module.

In an embodiment of the invention, the first image capturing unit is an RGB-IR image capturing unit, and the second image capturing unit is an RGB image capturing unit.

In an embodiment of the invention, the first image capturing unit is a MONO-IR image capturing unit, and the second image capturing unit is an RGB image capturing unit.

In an embodiment of the invention, the first image capturing unit is an RGB-IR image capturing unit, and the second image capturing unit is a MONO image capturing unit.

In an embodiment of the invention, the frame structure has three openings located in a same axial direction, and the first image capturing unit, the second image capturing unit, and the infrared emitting unit are respectively disposed in the three openings.

In an embodiment of the invention, the frame structure further includes two adjacent sidewalls located in at least one of the openings, the first image capturing unit abuts the two adjacent sidewalls through a gapless structure and is positioned on the frame structure, and the axial direction is parallel to one of the sidewalls and is perpendicular to the other sidewall.

In an embodiment of the invention, a gap respectively exists between the first image capturing unit, the second image capturing unit, and the infrared emitting unit, and the openings, and a gel is adapted to be injected into the gap to respectively fix the first image capturing unit, the second image capturing unit, and the infrared emitting unit in the openings.

In an embodiment of the invention, the second image capturing unit is kept at a first distance from the first image capturing unit through a first connection portion of the frame structure, and the first distance is greater than 10 mm.

In an embodiment of the invention, the infrared emitting unit is kept at a second distance from the first image capturing unit through a second connection portion of the frame structure, and the second distance is greater than 10 mm.

In an embodiment of the invention, the first image capturing unit has a first optical axis, the second image capturing unit has a second optical axis, and a difference in an inclination angle of the second optical axis relative to the first optical axis is less than 0.5 degrees.

In an embodiment of the invention, the second optical axis is parallel to the first optical axis.

In an embodiment of the invention, the infrared emitting unit has a third optical axis, and a difference in an inclination angle of the third optical axis relative to the first optical axis is less than 0.5 degrees.

In an embodiment of the invention, the third optical axis is parallel to the first optical axis, and the third optical axis is parallel to the second optical axis.

In an embodiment of the invention, the third optical axis is parallel to the first optical axis.

In an embodiment of the invention, the frame structure is a rigid structure.

In an embodiment of the invention, a focal length of the first image capturing unit is different from a focal length of the second image capturing unit.

In an embodiment of the invention, a resolution of the first image capturing unit is different from a resolution of the second image capturing unit.

In an embodiment of the invention, the at least one second image capturing unit includes two second image capturing units disposed adjacent to each other on the frame structure. The first image capturing unit, the two second image capturing units, and the infrared emitting unit are respectively disposed in four openings of the frame structure arranged along a same axial direction, and the two second image capturing units are located between the first image capturing unit and the infrared emitting unit.

In an embodiment of the invention, one of the second image capturing units is an RGB image capturing unit, and the other one of the second image capturing units is a MONO image capturing unit.

In an embodiment of the invention, the two second image capturing units are both RGB image capturing units.

In an embodiment of the invention, focal lengths of the two second image capturing units are different from each other.

In an embodiment of the invention, resolutions of the two second image capturing units are different from each other.

In an embodiment of the invention, a distance between the two second image capturing units is less than 10 mm, and a distance between the infrared emitting unit and the first image capturing unit is greater than or equal to 15 mm.

In light of the above, the image capturing device includes the first image capturing unit, the at least one second image capturing unit, and the infrared emitting unit, and these components are disposed on the same frame structure. Therefore, these components can be regarded as having the same optical reference, and thereby the first image capturing unit and the infrared emitting unit can form the structured light depth camera module, and the first image capturing unit and the second image capturing unit can form the stereo light depth camera module. Accordingly, the different image capturing units not only allow the image capturing device to achieve different image capturing functions, but the different image capturing units also achieve the same optical reference through the frame structure, such that the image capturing device can equally provide better image capturing effect and quality when executing different image capturing functions.

To provide a further understanding of the aforementioned and other features and advantages of the disclosure, exemplary embodiments, together with the reference drawings, are described in detail below.

DESCRIPTION OF THE EMBODIMENTS

Figure 1:
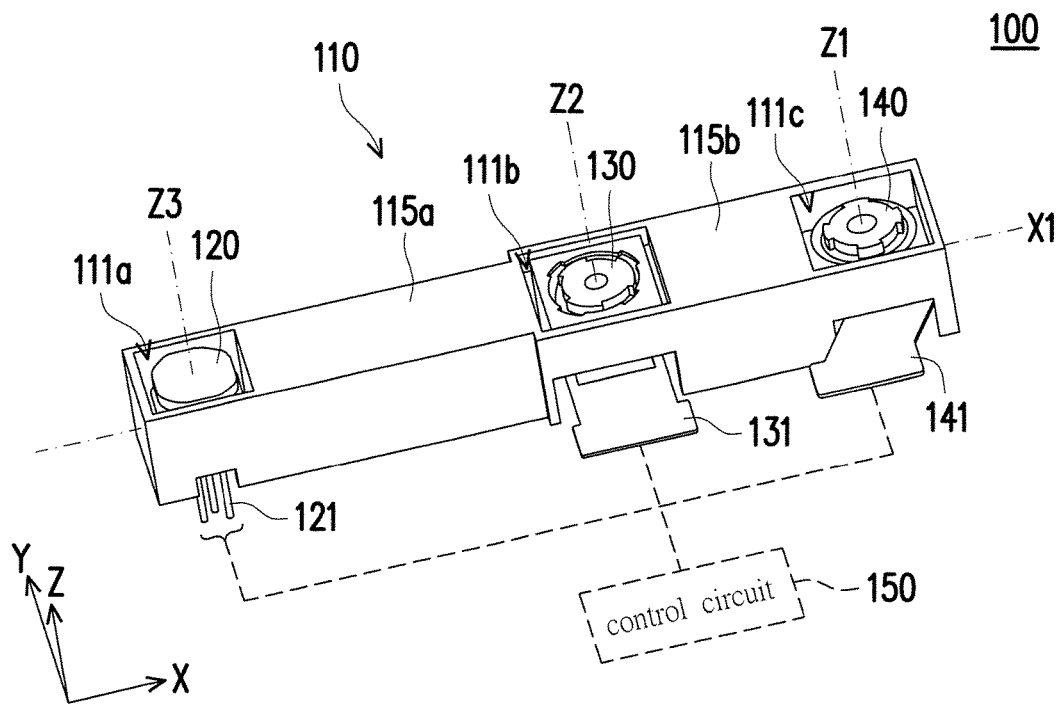
FIG. 1 is a schematic diagram illustrating an image capturing device according to an embodiment of the invention.
Figure 2:
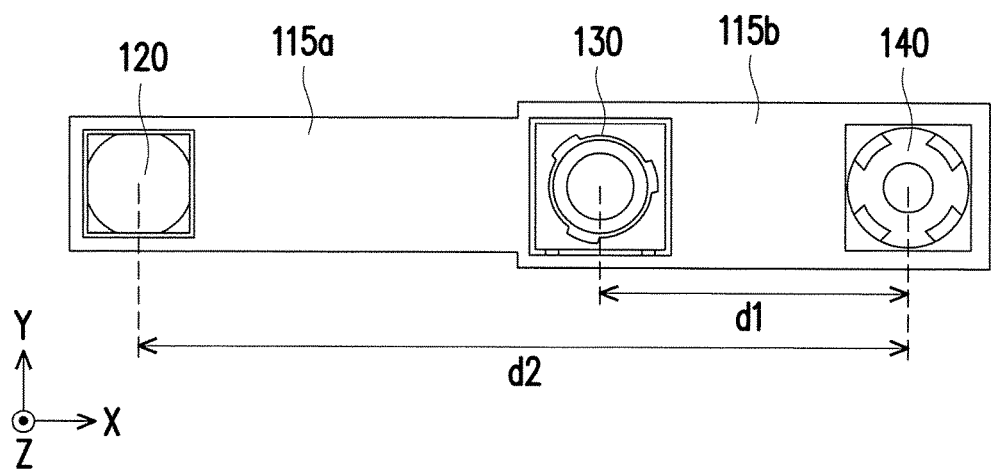
FIG. 2 is a top view illustrating the image capturing device of FIG. 1.
Figure 3:
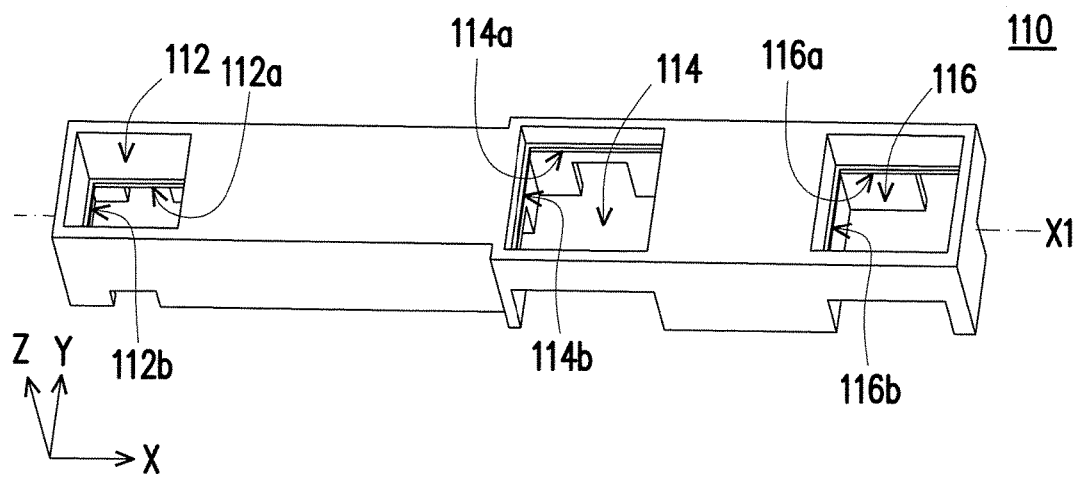
FIG. 3 is a schematic diagram illustrating a frame structure of the image capturing device of FIG. 1.

FIG. 1 is a schematic diagram illustrating an image capturing device according to an embodiment of the invention. FIG. 2 is a top view illustrating the image capturing device of FIG. 1. FIG. 3 is a schematic diagram illustrating a frame structure of the image capturing device of FIG. 1. Cartesian coordinate axes X-Y-Z are also provided here to facilitate relevant descriptions. Referring to FIG. 1 to FIG. 3 at the same time, in the present embodiment, an image capturing device 100 includes a frame structure 110, and a first image capturing unit 140, a second image capturing unit 130, and an infrared emitting unit 120 disposed thereon. The first image capturing unit 140, the second image capturing unit 130, and the infrared emitting unit 120 are arranged along an axial direction X1 and are respectively assembled in three openings 112, 114, 116 of the frame structure 110. In other words, an arrangement axial direction of the first image capturing unit 140, the second image capturing unit 130, and the infrared emitting unit 120 is consistent with an extension axial direction of the frame structure 110.

As shown in FIG. 1, the image capturing device 100 further includes a control circuit 150 including a driving element for controlling the first image capturing unit 140, the second image capturing unit 130, and the infrared emitting unit 120, a relevant calculation element for processing images, and an evaluation element for comparing images and performing repairs. A connection portion 141 (e.g., a flexible circuit board) of the first image capturing unit 140, a connection portion 131 (e.g., a flexible circuit board) of the second image capturing unit 130, and a connection portion 121 (electrical pins) of the infrared emitting unit 120 are electrically connected to the control circuit 150. A method of electrical connection of the first image capturing unit 140, the second image capturing unit 130, and the infrared emitting unit 120 to the control circuit 150 is not limited here. These components may be individually disposed on a circuit board and then collectively connected to the control circuit 150. Alternatively, they may be disposed on a single circuit board (or flexible circuit board) together with the control circuit 150.

Here, the first image capturing unit 140 is an RGB-IR image capturing unit for capturing color images or infrared images, and the second image capturing unit 130 is an RGB image capturing unit for capturing color images. Specifically, the first image capturing unit 140 is, for example, formed by removing an infrared filter from an RGB image capturing unit. Therefore, the first image capturing unit 140 and the infrared emitting unit 120 can form a structured light depth camera module, and the first image capturing unit 140 and the second image capturing unit 130 respectively capture images of the same scene (which is also the scene where the infrared emitting unit 120 projects patterned invisible light) from different angles of view to form a stereo light depth camera module. Accordingly, the image capturing device 100 can have the capability of generating two-dimensional and three-dimensional images and obtaining image depth information. Here, the RGB-IR image capturing unit and the RGB image capturing unit respectively include a camera body, a lens module, a filter element, a sensing element, and a circuit board, and their structural configurations can be learned from the prior art and are thus not repeatedly described here.

It shall be noted that the first image capturing unit 140 and the second image capturing unit 130 may also be the following combinations. For example, the first image capturing unit is a MONO-IR image capturing unit, and the second image capturing unit is an RGB image capturing unit. Alternatively, the first image capturing unit is an RGB-IR image capturing unit, and the second image capturing unit is a MONO image capturing unit.

Generally, based on corresponding image depth information (depth map), the calculation element of the image capturing device 100 can determine relative distances among a plurality of objects or features in a scene where the image capturing device 100 is located to thereby precisely present a stereo image related to the scene. Specifically, the image capturing device 100 generates a first image of the scene by extracting RGB light information (which is regarded as visible light information) through the second image capturing unit 130, and then generates a second image of the scene by extracting RGB light information (which is regarded as visible light information) through the first image capturing unit 140 and extracting infrared light information (which is regarded as invisible light information) through the infrared emitting unit 120. Here, the infrared emitting unit 120 may project patterned invisible light (infrared light) onto a scene according to a default pattern to allow the first image capturing unit 140 to capture an invisible light pattern reflected by the scene (and the objects), which is then combined with the extracted RGB light information to form the second image.

Then, the control circuit 150 processes relevant information of the first image and the second image by comparing the visible light information of the first image and the visible light information of the second image to obtain first depth information, which is generated, for example, from image parallax of the first image capturing unit and the second image capturing unit. Moreover, second depth information is obtained by identifying the invisible light information of the second image. As mentioned above, the reflected infrared light pattern is sensed by the first image capturing unit, and a plurality of depth distances of the scene are determined according to distortion, skewness, scaling, displacement, and other conditions of the infrared light pattern to thereby obtain the second depth information. Lastly, the evaluation element of the control circuit 150 compares the first depth information and the second depth information and meanwhile provides retention or repairs to generate final depth information. However, the invention does not limit the means for processing the relevant depth information.

Figure 4:
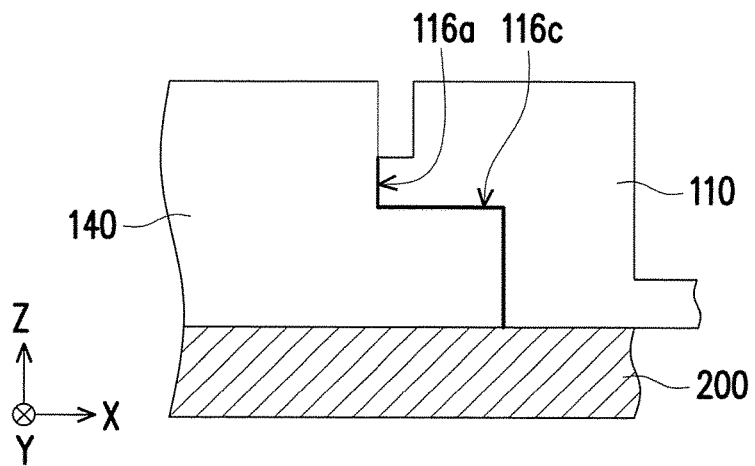
FIG. 4 is a partial cross-sectional diagram illustrating an image capturing unit and a frame structure.
Figure 5:
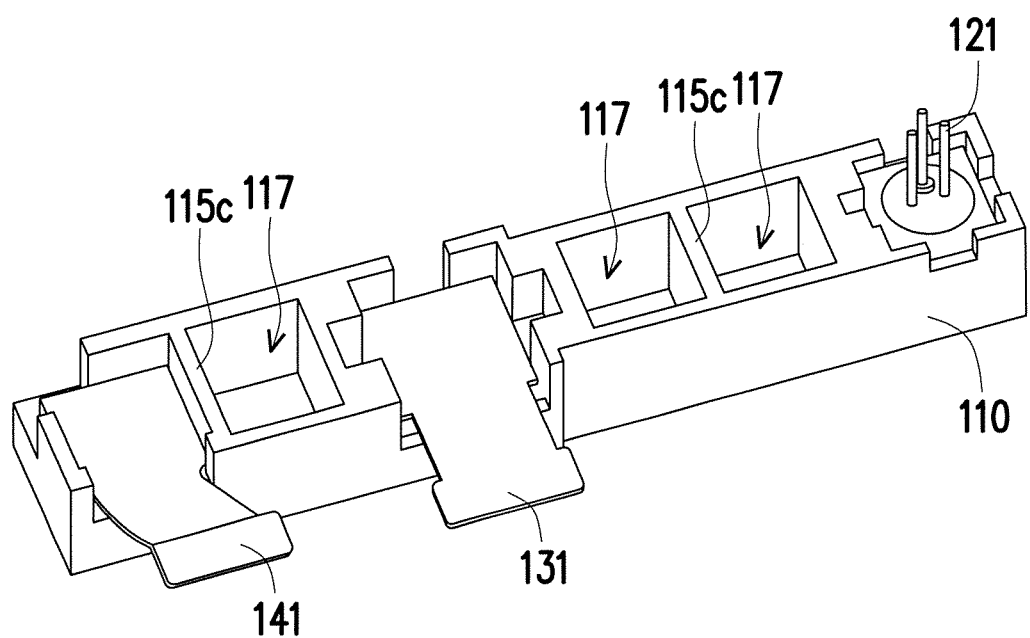
FIG. 5 illustrates the image capturing device of FIG. 1 from another angle of view.

In light of the above, to allow the image capturing device 100 to successfully capture the image, the same optical reference must be provided to reduce differences in structural locations among the image capturing units and to avoid affecting precision of the captured image. Accordingly, the frame structure 110 of the present embodiment is substantially an integral rigid structure. In other words, the frame structure 110 itself is not subjected to deformation or structural displacement. FIG. 4 is a partial cross-sectional diagram illustrating the image capturing unit and the frame structure. FIG. 5 illustrates the image capturing device of FIG. 1 from another angle of view. Referring to FIG. 1 and FIG. 5 first, in the present embodiment, the frame structure 110 further includes extension portions 115a, 115b connecting between the openings for separating the openings 112, 114, 116 and the first image capturing unit 140, the second image capturing unit 130, and the infrared emitting unit 120 located therein.

Moreover, the frame structure 110 further includes a plurality of protruding ribs 115c and recesses 117 that are located on a bottom surface and are respectively disposed between the openings 116, 114, 112 at a bottom portion, i.e., being located under the extension portions 115a, 115b (from the angle of view of FIG. 1). In other words, in terms of the structural layout of the frame structure 110, with the extension portions 115a, 115b, the protruding ribs 115c, and the recesses 117 functioning together, rigidity can be effectively enhanced. Namely, as the object to which the first image capturing unit 140, the second image capturing unit 130, and the infrared emitting unit 120 are assembled, the frame structure 110 can structurally provide sufficient reference for avoiding occurrence of errors in component assembly. Moreover, as shown in FIG. 3, the frame structure 110 has a cap-shaped contour and further extends from surfaces of the extension portions 115a, 115b shown in FIG. 1 along Y-axis downward (along Z-axis). In another embodiment, the frame structure may also be in a plate shape, namely, in a state of having the extension portions 115a, 115b only.

Next, referring to FIG. 1, FIG. 3, and FIG. 4 again, as mentioned above, the first image capturing unit 140, the second image capturing unit 130, and the infrared emitting unit 120 are respectively assembled in the three openings 112, 114, 116. More specifically, the opening 116 has two adjacent sidewalls 116a, 116b, the opening 114 has two adjacent sidewalls 114a, 114b, and the opening 112 has two adjacent sidewalls 112a, 112b. As an example, the first image capturing unit 140 and the opening 116 are described in the text below. Here, the first image capturing unit 140 abuts the two adjacent sidewalls 116a, 116b through a gapless structure and is positioned on the frame structure 110. The axial direction X1 is parallel to one sidewall 116a and is perpendicular to the other sidewall 116b. Accordingly, the first image capturing unit 140 can be positioned in the opening 116 of the frame structure 110 along X-Y plane. Similarly, the second image capturing unit 130 and the infrared emitting unit 120 may also be positioned by using the adjacent two sidewalls in the other openings as the reference for positioning, which shall not be repeatedly described here. Moreover, the sidewalls 116a, 114a, 112a and 116b, 114b, 112b are provided with protruding structures, as shown in FIG. 3, to facilitate mounting of the first image capturing unit 140, the second image capturing unit 130, and the infrared emitting unit 120 by a user.

Moreover, in terms of positioning in a Z-axis direction, as shown in FIG. 4, the first image capturing unit 140 needs to tightly abut the frame structure 110 along Z-axis through a jig 200 to allow a portion of the first image capturing unit 140 to gaplessly abut a top wall 116c of the frame structure 110 located at the opening 116 to thereby achieve the positioning effect in Z-axis. Similarly, the second image capturing unit 130 and the infrared emitting unit 120 may also achieve the same positioning reference through the top walls at the other openings.

On the other hand, referring to FIG. 1 again, in the present embodiment, when the first image capturing unit 140, the second image capturing unit 130, and the infrared emitting unit 120 are respectively positioned on the frame structure 110 as described above, they respectively form gaps 111c, 111b, 111a with the openings 116, 114, 112 of the frame structure 110. A gel (e.g., a thermal curing gel or a photo curing gel) is adapted to be injected into the gaps 111c, 111b, 111a to fixedly combine the positioned first image capturing unit 140, second image capturing unit 130, and infrared emitting unit 120 with the frame structure 110. As mentioned above, due to the presence of the protruding structure, the gaps 111c, 111b, 111a are formed only after mounting.

As shown in FIG. 2, in the present embodiment, in the image capturing device 100 for which combination is completed, the second image capturing unit 130 is kept at a first distance d1 from the first image capturing unit 140 through the extension portion 115b of the frame structure 110, and the first distance d1 is greater than 10 mm. Meanwhile, the infrared emitting unit 120 is further spaced apart from the second image capturing unit 130 through the extension portion 115a, such that the second image capturing unit 130 is located between the first image capturing unit 140 and the infrared emitting unit 120. Moreover, the infrared emitting unit 120 is at a second distance d2 from the first image capturing unit 140, and the second distance d2 is greater than the first distance d1. Accordingly, the image capturing device of the invention exhibits characteristics of structural tightness and a smaller size.

In another unillustrated embodiment, the second distance d2 from the infrared emitting unit 120 to the first image capturing unit 140 is greater than 10 mm. The distance described above refers to a distance between center points of objects, i.e., an interval between lens centers of the image capturing units.

Moreover, to achieve optical zoom-like effect, a focal length of the first image capturing unit 140 may be different from a focal length of the second image capturing unit 130. For example, one of them may be a wide-angle lens, and the other one may be a long-focus lens. Alternatively, one of them may be a standard lens, and the other one may be a long-focus lens. However, the present embodiment is not limited hereto. In addition, to lower production costs of the image capturing device, in another embodiment, a resolution of the first image capturing unit 140 is different from a resolution of the second image capturing unit 130.

Referring to FIG. 1 again, through the positioning and combination designs described above, due to the characteristic of the frame structure 110 as a rigid structure, in the image capturing device 100 of the present embodiment, a difference in an inclination angle between a first optical axis Z1 of the first image capturing unit 140 and a second optical axis Z2 of the second image capturing unit 130 is less than 0.5 degrees, and more preferably, the second optical axis Z2 is parallel to the first optical axis Z1 (namely, the first optical axis Z1 and the second optical axis Z2 are both parallel to Z-axis), and both are perpendicular to a light injection surface of the first image capturing unit 140 and the second image capturing unit 130. Accordingly, the optical reference is effectively configured to be consistent between the first image capturing unit 140 and the second image capturing unit 130, such that structural errors between the two components do not arise from the assembly process, the structural dimensions, or the material properties, and the quality and precision of the captured images are not affected.

Moreover, in the present embodiment, the infrared emitting unit 120 has a third optical axis Z3, and a difference in the inclination angle between the third optical axis Z3 and the first optical axis Z1 is less than 0.5 degrees, and more preferably, the third optical axis Z3 is parallel to the first optical axis Z1 (namely, the first optical axis Z1 and the third optical axis Z3 are both parallel to Z-axis) to ensure that the optical reference is consistent between the infrared emitting unit 120 and the first image capturing unit 140.

It shall be additionally noted that, in the present embodiment, the first image capturing unit 140, the second image capturing unit 130, and the infrared emitting unit 120 are assembled and positioned in the following sequence. The first image capturing unit 140 is first assembled to the frame structure 110 (positioned and combined on X-Y plane in the Z-axis direction as described above), and, using the first optical axis Z1 of the first image capturing unit 140 as the reference, the second image capturing unit 130 and the infrared emitting unit 120 are then respectively adjusted and positioned. The reason lies in that, based on the configurations of the structured light depth camera module and the stereo light depth camera module, calibrating the second image capturing unit 130 by using the first image capturing unit 140 as the reference ensures the quality and precision of the images captured by the stereo light depth camera module, and calibrating the infrared emitting unit 120 by using the first image capturing unit 140 as the reference ensures the quality and precision of the images captured by the structured light depth camera module.

Figure 6:
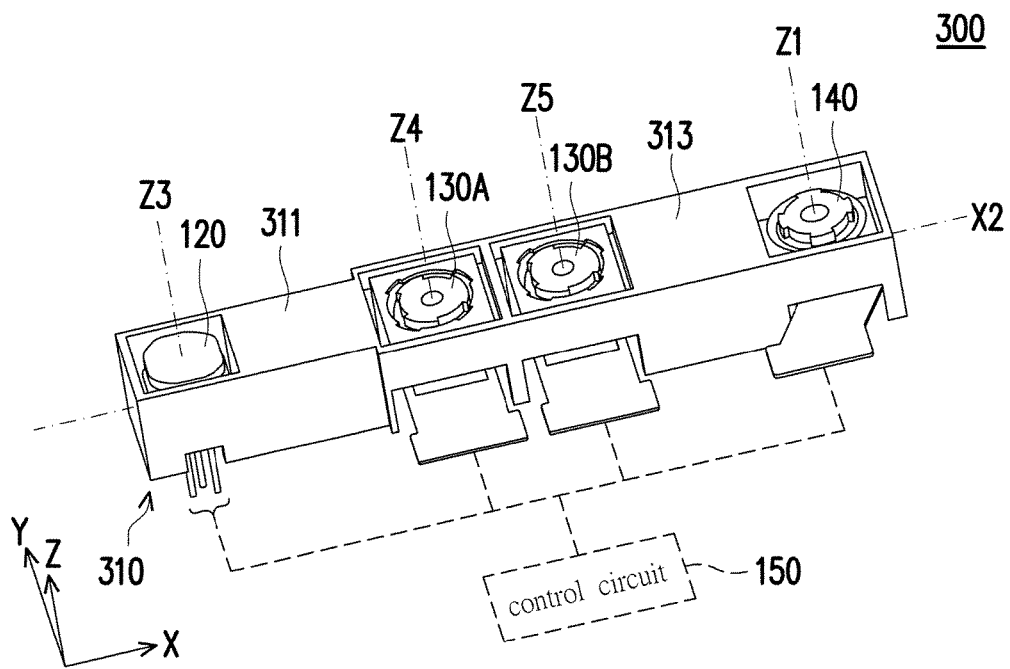
FIG. 6 is a schematic diagram illustrating an image capturing device according to another embodiment of the invention.
Figure 7:
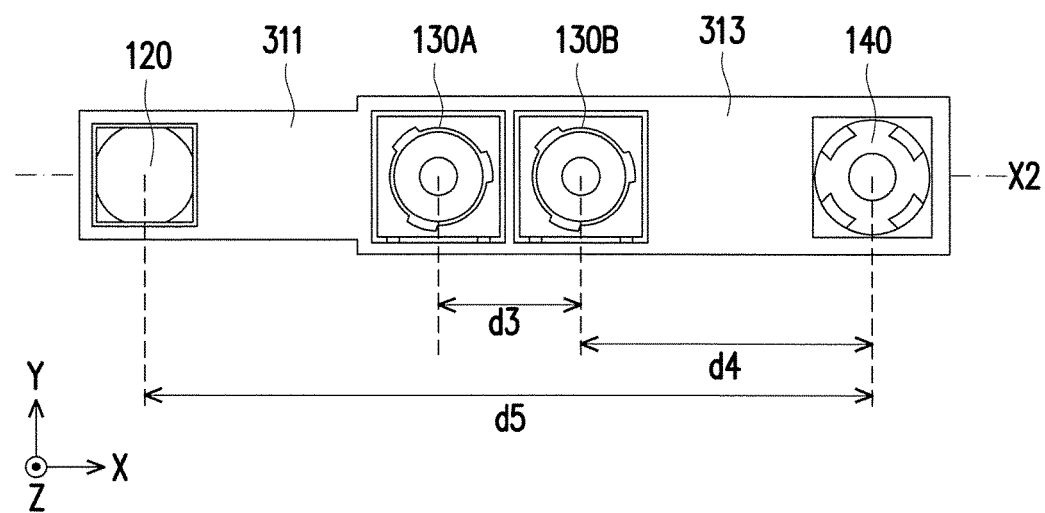
FIG. 7 is a partial top view illustrating the image capturing device of FIG. 6.
Figure 8:
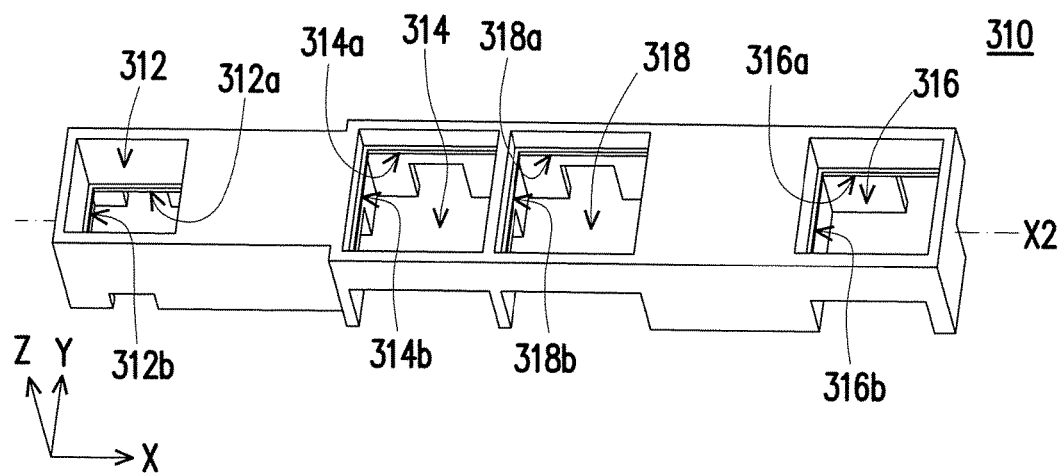
FIG. 8 is a schematic diagram illustrating a frame structure of the image capturing device of FIG. 6.

FIG. 6 is a schematic diagram illustrating an image capturing device according to another embodiment of the invention. FIG. 7 is a partial top view illustrating the image capturing device of FIG. 6. FIG. 8 is a schematic diagram illustrating a frame structure of the image capturing device of FIG. 6. Referring to FIG. 6 to FIG. 8 at the same time, in the present embodiment, an image capturing device 300 includes a frame structure 310, a first image capturing unit 140, two second image capturing units 130A, 130B, and an infrared emitting unit 120, wherein the frame structure 310 has four openings 312, 314, 318, 316 arranged along a same axial direction X2, the infrared emitting unit 120 is disposed in the opening 312, the second image capturing unit 130A is disposed in the opening 314, the second image capturing unit 130B is disposed in the opening 318, and the first image capturing unit 140 is disposed in the opening 316. The two second image capturing units 130A, 130B are adjacent to each other and are located between the infrared emitting unit 120 and the first image capturing unit 140. The first image capturing unit 140, the two second image capturing units 130A, 130B, and the infrared emitting unit 120 are respectively electrically connected to a control circuit 150 for controlling and adjusting the image capturing means.

Figure 9:
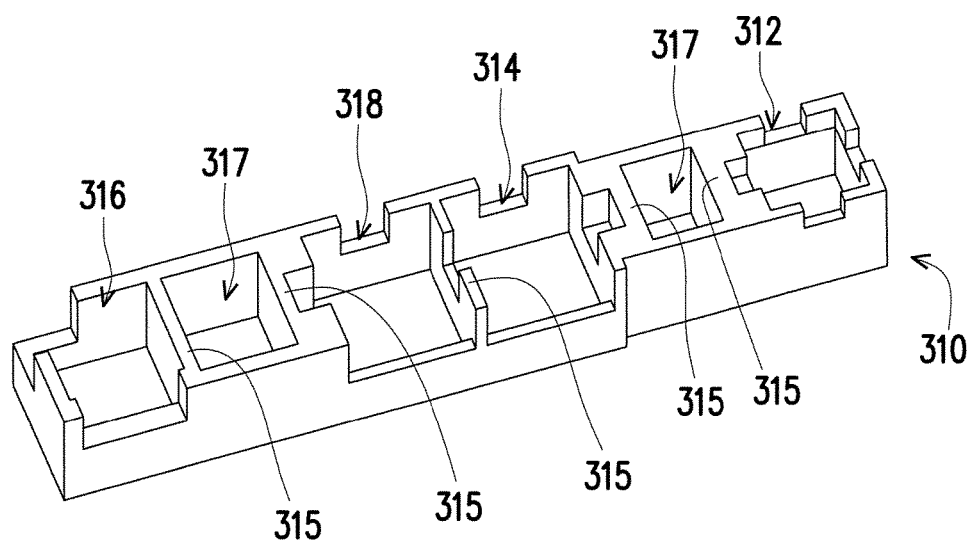
FIG. 9 illustrates the frame structure of FIG. 8 from another angle of view.
Figure 10:
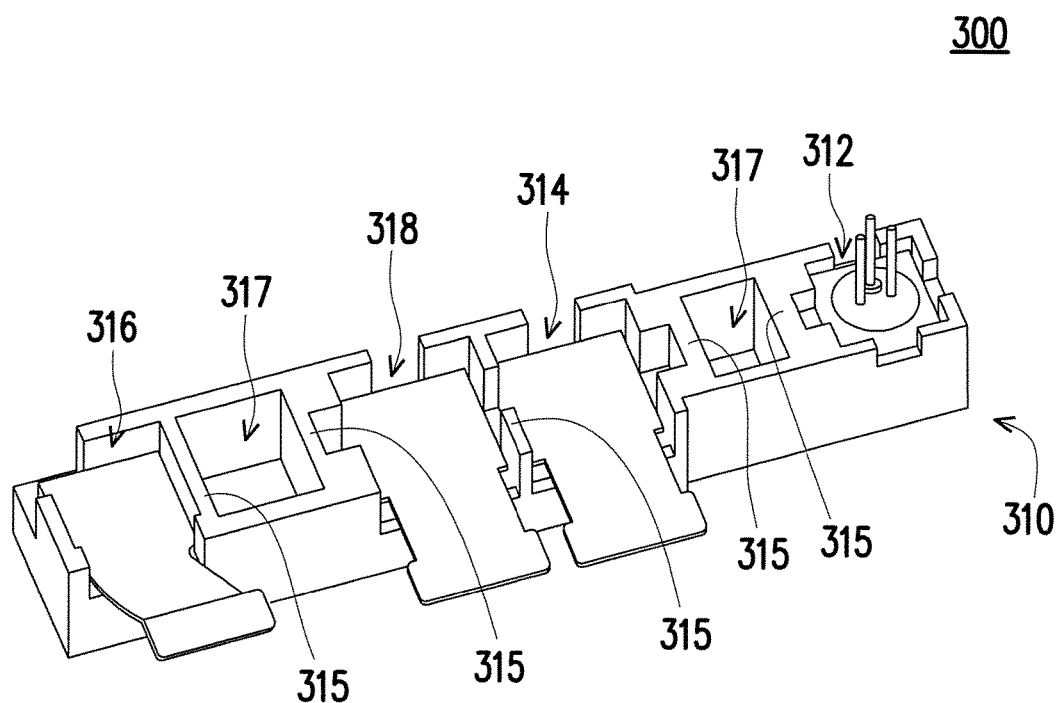
FIG. 10 illustrates the image capturing device of FIG. 6 from another angle of view.

Here, corresponding configurations of the infrared emitting unit 120, the first image capturing unit 140, the second image capturing units 130A, 130B, and the frame structure 310 are largely identical to those described in the previous embodiment. For example, FIG. 9 illustrates the frame structure of FIG. 8 from another angle of view. FIG. 10 illustrates the image capturing device of FIG. 6 from another angle of view. Here, the frame structure 310 similarly includes protruding structures disposed on sidewalls 312a, 312b, 314a, 314b, 316a, 316b, 318a, 318b of the openings 312 to 318 for mounting the first image capturing unit 140, the two second image capturing units 130A, 130B, and the infrared emitting unit 120 and meanwhile providing the reference for positioning. As shown in FIG. 9 and FIG. 10, a bottom portion of the frame structure 310 also includes a plurality of recesses 317 and protruding ribs 315, which constitute essential structural features for the frame structure 310 to be regarded as a rigid structure and cause differences in the inclination angles among a fourth optical axis Z4, a fifth optical axis Z5, the first optical axis Z1, and the third optical axis Z3 of the image capturing units (i.e., 130A, 130B, and 140) and the infrared emitting unit 120 to be less than 0.5 degrees. In other words, due to the structural features of the frame structure 310, the optical reference is consistent between the image capturing units and the infrared emitting unit, such that structural errors between the two do not arise from the assembly process, the structural dimensions, or the material properties, and the quality and precision of the captured images are not affected.

Based on the above, the following text only describes the difference, and the same features can be learned from the drawings and the foregoing embodiment and are thus not repeatedly described here.

The difference from the foregoing embodiment lies in that the present embodiment includes the two second image capturing units. Therefore, the image capturing function achieved by the image capturing device 300 can be further enhanced.

In the present embodiment, one of the two second image capturing units 130A, 130B is an RGB image capturing unit, and the other one is a MONO image capturing unit. Both are used to obtain visible light images, but one captures color images and the other one captures black and white images. Therefore, the resolution can be enhanced (namely, a resolution of the black and white images obtained by the MONO image capturing unit is better than a resolution of the color images obtained by the RGB image capturing unit). After further working with the first image capturing unit 140 (a MONO-IR image capturing unit or an RGB-IR image capturing unit), more depth information can be obtained.

Of course, in another embodiment, the two second image capturing units 130A, 130B may respectively cover Bayer filters of different types and respectively form RGB image capturing units. Similarly, they work with the first image capturing unit 140 (a MONO-IR image capturing unit or an RGB-IR image capturing unit) to successfully obtain depth information of the scene. Similarly, focal lengths of the two second image capturing units 130A, 130B may be different from each other for obtaining more precise 3D scene depth information. Similarly, to facilitate image comparison, the resolutions of the two second image capturing units 130A, 130B may also be different but are not limited hereto (namely, they may also be identical).

In addition, referring to FIG. 7 again, a third distance d3 exists between the two adjacent second image capturing units 130A, 130B, a fourth distance d4 exists between the second image capturing unit 130A and the first image capturing unit 140, and a fifth distance d5 exists between the infrared emitting unit 120 and the first image capturing unit 140. Here, the third distance d3 is less than 10 mm to facilitate capturing images of the same angle of view. The fourth distance d4, like the first distance d1, is greater than 10 mm, so that image differences between the visible light images (captured by the second image capturing unit 130A) and the invisible light images (captured by the first image capturing unit 140) can be compared due to the different angles of view. Moreover, the fifth distance d5, like the second distance d2, is greater than or equal to 15 mm, and the fifth distance d5 is greater than the fourth distance d4, so that characteristics of structural tightness and a smaller size are achieved.

On the other hand, in an embodiment, an interval between the infrared emitting unit 120 and the first image capturing unit 140 is greater than or equal to 10 mm, and a distance between the second image capturing unit 130A and the first image capturing unit 140 is greater than or equal to 10 mm. In another embodiment, the distance between the second image capturing units 130A, 130B is less than 10 mm, the interval between the infrared emitting unit 120 and the first image capturing unit 140 is greater than or equal to 15 mm, and the distance between the second image capturing unit 130A and the first image capturing unit 140 is greater than or equal to 15 mm.

Since the image capturing units and the infrared emitting unit are disposed on the frame structure 310, the distances between the image capturing units and the infrared emitting unit may also be regarded as distance effect created by extension portions 311, 313 (illustrated in FIG. 6 and FIG. 7) of the frame structure 310.

In summary of the above, in the embodiments of the invention, the image capturing device includes the first image capturing unit, the at least one second image capturing unit, and the infrared emitting unit, and these components are disposed on the same frame structure. Therefore, these components can be regarded as having the same optical reference, and thereby the first image capturing unit and the infrared emitting unit can form the structured light depth camera module, and the first image capturing unit and the second image capturing unit can form the stereo light depth camera module. Specifically, the frame structure itself is a rigid structure, so it does not deform and issues such as structural displacement are avoided. On this basis, the first image capturing unit, the second image capturing unit, and the infrared emitting unit are further positioned on X-Y plane through the sidewalls at the openings and are positioned in Z-axis through the jig, such that structural and assembly errors in the first image capturing unit, the second image capturing unit, and the infrared emitting unit can be avoided through the frame structure. Meanwhile, positioning the first image capturing unit to the frame structure and, by using it as the reference, then calibrating the second image capturing unit and the infrared emitting unit can also effectively ensure the quality and precision of the images captured by the stereo light depth camera module and the structured light depth camera module.

Moreover, the image capturing device further includes the two second image capturing units, wherein characteristics including structural configuration tightness and structural rigidity provided by the frame structure allow the image capturing device to maintain the required optical reference even if it is additional disposed with the another second image capturing unit. Meanwhile, the additionally disposed second image capturing unit provides the image capturing device with more image capturing function and image comparison effect, and further enhances the capability and applicability of the image capturing device.

Accordingly, the different image capturing units not only allow the image capturing device to achieve different image capturing functions, but the different image capturing units also achieve the same optical reference through the frame structure, such that the image capturing device can equally provide better image capturing effect and quality when executing different image capturing functions.

In other words, the image capturing device of the embodiments integrates an image capturing unit capable of obtaining visible light information with another image capturing unit capable of obtaining visible light and invisible light information so as to more desirably generate 3D images and provide more precise depth information to be applied to 3D image reconstruction.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An image capturing device comprising:
a frame structure;
a first image capturing unit, wherein the first image capturing unit has a first optical axis;
at least one second image capturing unit, wherein each of the at least one second image capturing unit has a second optical axis; and
an infrared emitting unit, wherein the infrared emitting unit has a third optical axis, the first image capturing unit, the second image capturing unit, and the infrared emitting unit are respectively disposed on the frame structure, the first image capturing unit and the infrared emitting unit form a structured light depth camera module, and the first image capturing unit and the second image capturing unit form a stereo light depth camera module,
wherein a difference in an inclination angle of the second optical axis relative to the first optical axis is less than 0.5 degrees, and a difference in an inclination angle of the third optical axis relative to the first optical axis is less than 0.5 degrees.

2. The image capturing device according to claim 1, wherein the first image capturing unit is an RGB-IR image capturing unit, and the second image capturing unit is an RGB image capturing unit.

3. The image capturing device according to claim 1, wherein the first image capturing unit is a MONO-IR image capturing unit, and the second image capturing unit is an RGB image capturing unit.

4. The image capturing device according to claim 1, wherein the first image capturing unit is an RGB-IR image capturing unit, and the second image capturing unit is a MONO image capturing unit.

5. The image capturing device according to claim 1, wherein the frame structure has three openings located in a same axial direction, and the first image capturing unit, the second image capturing unit, and the infrared emitting unit are respectively disposed in the three openings.

6. The image capturing device according to claim 5, wherein the frame structure further comprises two adjacent sidewalls located in at least one of the openings, the first image capturing unit abuts the two adjacent sidewalls through a gapless structure and is positioned on the frame structure, and the axial direction is parallel to one of the sidewalls and is perpendicular to the other sidewall.

7. The image capturing device according to claim 5, wherein a gap respectively exists between the first image capturing unit, the second image capturing unit, and the infrared emitting unit, and the openings, and a gel is adapted to be injected into the gap to respectively fix the first image capturing unit, the second image capturing unit, and the infrared emitting unit in the openings.

8. The image capturing device according to claim 1, wherein the second image capturing unit is kept at a first distance from the first image capturing unit through an extension portion of the frame structure, and the first distance is greater than 10 mm.

9. The image capturing device according to claim 1, wherein the infrared emitting unit is kept at a second distance from the first image capturing unit through an extension portion of the frame structure, and the second distance is greater than 10 mm.

10. The image capturing device according to claim 1, wherein the second optical axis is parallel to the first optical axis.

11. The image capturing device according to claim 10, wherein the at least one second image capturing unit comprises two second image capturing units disposed adjacent to each other on the frame structure, wherein the first image capturing unit, the two second image capturing units, and the infrared emitting unit are respectively disposed in four openings of the frame structure arranged along a same axial direction, and the two second image capturing units are located between the first image capturing unit and the infrared emitting unit.

12. The image capturing device according to claim 11, wherein one of the second image capturing units is an RGB image capturing unit, and the other one of the second image capturing units is a MONO image capturing unit.

13. The image capturing device according to claim 11, wherein the two second image capturing units are both RGB image capturing units.

14. The image capturing device according to claim 11, wherein focal lengths of the two second image capturing units are different from each other.

15. The image capturing device according to claim 11, wherein resolutions of the two second image capturing units are different from each other.

16. The image capturing device according to claim 11, wherein a distance between the two second image capturing units is less than 10 mm, and a distance between the infrared emitting unit and the first image capturing unit is greater than or equal to 15 mm.

17. The image capturing device according to claim 1, wherein the third optical axis is parallel to the first optical axis.

18. The image capturing device according to claim 1, wherein the frame structure is a rigid structure.

19. The image capturing device according to claim 1, wherein a focal length of the first image capturing unit is different from a focal length of the second image capturing unit.

20. The image capturing device according to claim 1, wherein a resolution of the first image capturing unit is different from a resolution of the second image capturing unit.

* * * * *